(12) United States Patent
Hammerich

(10) Patent No.: US 6,211,760 B1
(45) Date of Patent: *Apr. 3, 2001

(54) SOLENOID VALVE

(75) Inventor: Christian Hammerich, Vamdrup (DK)

(73) Assignee: Danfoss A/S, Nordborg (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,264

(22) PCT Filed: May 7, 1998

(86) PCT No.: PCT/DK98/00182

§ 371 Date: Nov. 4, 1999

§ 102(e) Date: Nov. 4, 1999

(87) PCT Pub. No.: WO98/51946

PCT Pub. Date: Nov. 19, 1998

(30) Foreign Application Priority Data

May 12, 1997 (DK) .................................................. 0541 97

(51) Int. Cl.[7] ....................................................... H01F 7/08
(52) U.S. Cl. ...................... 335/220; 335/251; 251/129.15
(58) Field of Search ..................................... 335/220, 221, 335/222, 228, 229, 251, 256–7, 262; 251/129.15, 129.22

(56) References Cited

U.S. PATENT DOCUMENTS

| | | |
|---|---|---|
| 3,512,754 | 5/1970 | Zaino . |
| 3,692,057 | 9/1972 | Barnd . |
| 4,103,686 | * 8/1978 | LeFevre ........................... 251/129.16 |
| 4,905,962 | * 3/1990 | Ilijn ................................. 251/129.21 |
| 5,996,912 | * 12/1999 | Ren et al. ....................... 251/129.15 |

FOREIGN PATENT DOCUMENTS

| | | |
|---|---|---|
| 26 50 394 | 5/1978 | (DE) . |
| 38 11 438 | 10/1989 | (DE) . |
| 42 01 450 | 8/1993 | (DE) . |
| 115747 | 11/1969 | (DK) . |
| 0 486 945 | 5/1992 | (EP) . |
| 0 745 797 | 12/1996 | (EP) . |
| 1472848 | 1/1967 | (FR) . |
| 350 320 | 10/1972 | (SE) . |

* cited by examiner

Primary Examiner—Lincoln Donovan
(74) Attorney, Agent, or Firm—Lee, Mann, Smith, McWilliams, Sweeney & Ohlson

(57) ABSTRACT

A solenoid valve comprising a coil surrounding a guide for an armature, the armature being movable in the guide through magnetising of the coil or by means of a return mechanism, and a valve seat co-operating with a closing member for selective opening or closing of a valve opening through the valve seat controlled by the armature movement. As the closing member is a separate device in relation to the armature, which closing member is activated by the armature movement to a rocking movement around a contact point with the valve seat, an normally open or normally closed solenoid is obtained.

12 Claims, 4 Drawing Sheets

SOLENOID VALVE

BACKGROUND OF THE INVENTION

The invention concerns a solenoid valve of the kind mentioned in the preamble of claim 1.

In such solenoid valves the closing member is normally integrated in the armature, being a sealing surface inserted in the armature, which, by means of an armature return spring, at currentless (non-magnetised) coil is brought to sealingly bearing against the valve seat, and at magnetised coil is pulled away from the valve seat to permit medium flow through the valve opening. Such a solenoid valve, in which the medium flow is interrupted at currentless coil, is called a normally closed (N.C.) valve. In certain applications it would be advantageous to use a normally open (N.O.) valve, whose construction, however, is usually of a much more complicated nature.

The most frequently used medium flow direction in normal valves of the embodiment described above is into the valve housing, past the closing member and out through the valve opening in the valve seat. This gives a secure closing function, the increasing differential pressure acting upon the closing member to pressing harder against the valve seat. If, however, the flow direction is reversed, it is achieved that if the differential pressure exceeds a certain value, which is determined by the valve opening area and the force influence of the return mechanism, the pressure will move the closing member away from the valve seat and let the medium flow through the valve. In certain cases this function can be desirable as security valve function, but the pressure at which the valve opens is substantially determined in advance by the dimensioning requirements for return mechanism and valve opening determined by the solenoid valve function.

SUMMARY OF THE INVENTION

On the basis of this state of the art, it is the purpose of the present invention to produce a simplified construction of an N.O. solenoid valve. According to the invention this is obtained by the measures stated in the characterising part of claim 1.

Making the closing member as a separate part in relation to the armature, which member is activated by the armature movement to a rocking movement around a contact point with the valve seat, enables an inversion of the armature movement so that the valve becomes an N.O. valve. However, the force transfer between armature and closing member can also be made without this inversion, so that the valve is an N.C. valve.

Preferred embodiments of valve seat and closing member for production of rolling and/or sliding rocking movements of the closing member on a surface surrounding the valve seat are set forth below.

Preferred embodiments and arrangements of a closing spring for the closing member acting upon the closing member to perform a tight closing against the valve seat. The closing spring can be arranged between the armature and the closing member or, pass through a bore in the armature and rest against the bottom of the armature guide.

Preferably, the rocking movement is produced by means of a projecting edge on the armature or the closing member, respectively, which edge makes the armature act upon the closing member offset in relation to the valve seat centre outside the valve seat diameter.

The offset action can also, be produced or supplemented, respectively, by an asymmetrical arrangement of the armature in relation to the closing member.

When using the solenoid valve comprising a closing spring for urging of the closing member against the valve seat in an application, in which the medium flows in via the valve seat, the security function mentioned above is obtained, the construction according to the present invention giving an additional degree of freedom for the opening pressure of the security valve, which is determined by the valve opening area and the closing spring force, which can be selected rather randomly.

BRIEF DESCRIPTION OF THE DRAWING

In the following the invention is described in detail by means of embodiment examples with reference to the drawings, showing.

DESCRIPTION OF THE PREFERRED EMBODIMENT

Figure 1:
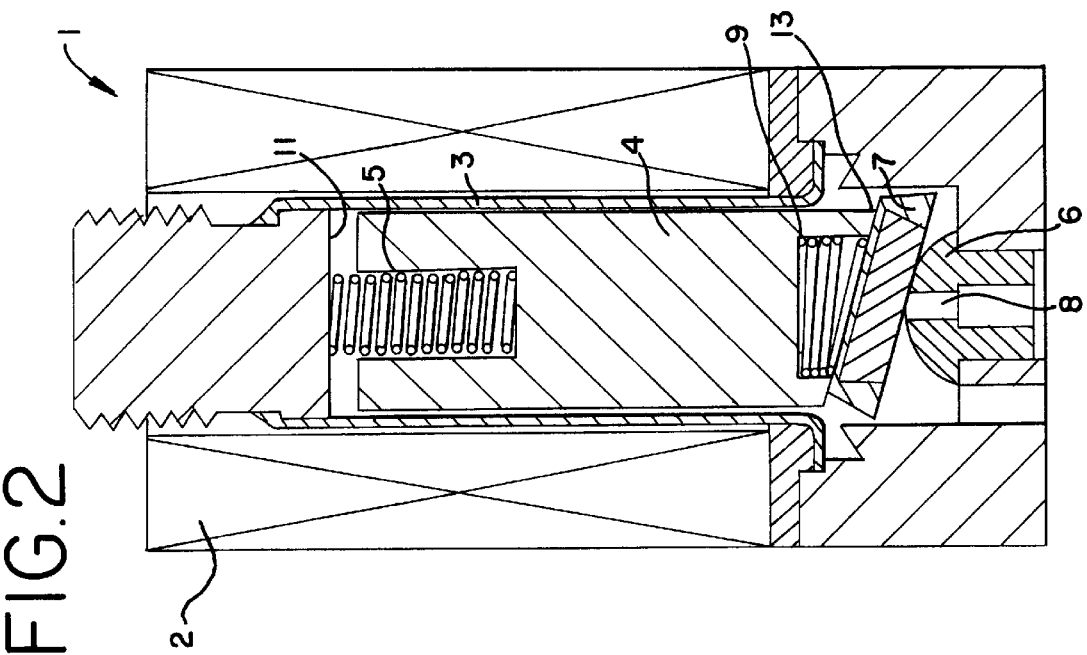
FIG. 1 an embodiment according to the invention of an N.O. solenoid valve with activated coil, that is, in the closed state of the valve FIG. 2 the solenoid valve according to FIG. 1 in the open state of the valve
Figure 2:
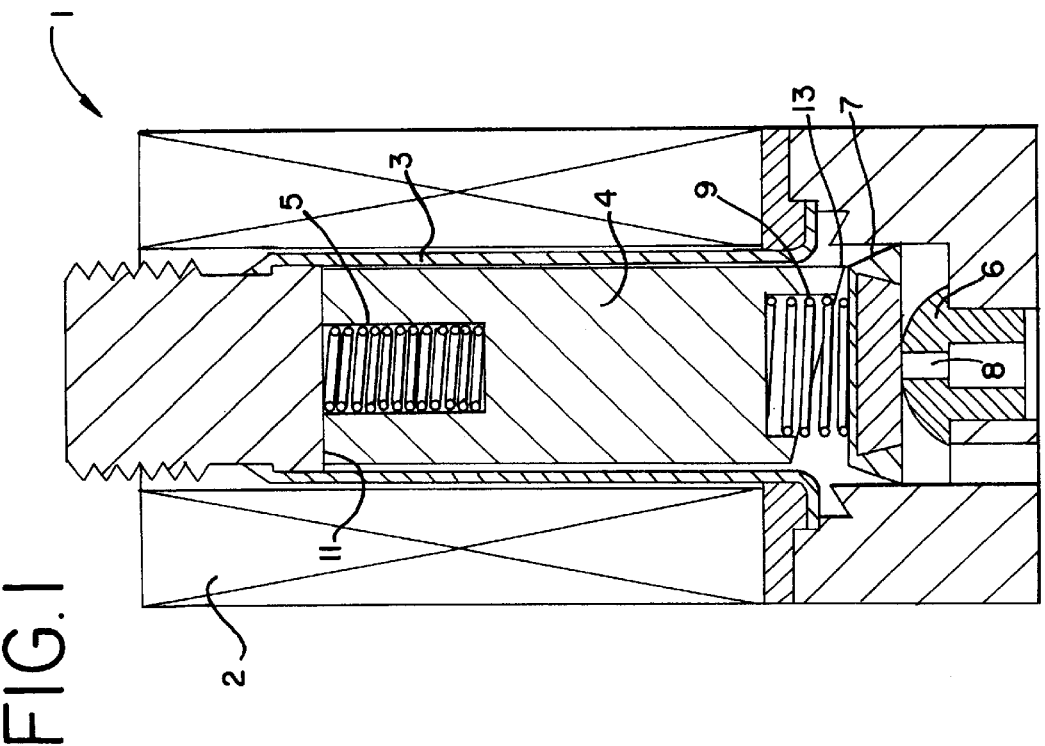

The embodiment of a solenoid valve according to the invention shown in FIGS. 1 and 2 comprises a coil 2 arranged around an armature guide 3 of an armature 4 and an armature return spring 5, so that the armature 4 can be brought to move towards the armature guide bottom 11 on activation of the coil and towards the valve seat 6 on de-activation of the coil, as the armature 4 is acted upon by the armature return spring 5, which acts upon the armature 4 with the armature guide bottom 11 as pressure reference. Further, the solenoid valve comprises a valve seat 6 and a closing member 7, which are pressed by a closing spring 9 in the direction of the valve seat 6, so as to close the valve opening 8 in the valve seat 6 in the activated state of the coil. When the armature is released from the activated position shown in FIG. 1 and moves towards the non-activated position shown in FIG. 2, the projecting edge 13 of the armature acts upon the closing member to perform a rocking movement around the valve seat, which, in view of this rocking movement is made with a rounded surface. In the embodiment shown in FIGS. 1 and 2 the closing spring is arranged in the end of the armature 4 facing the valve seat 6, so that the closing spring uses the armature as pressure reference. The action on the closing member 7 from the closing spring 9 thus varies with the position of the armature 4.

Figure 4:
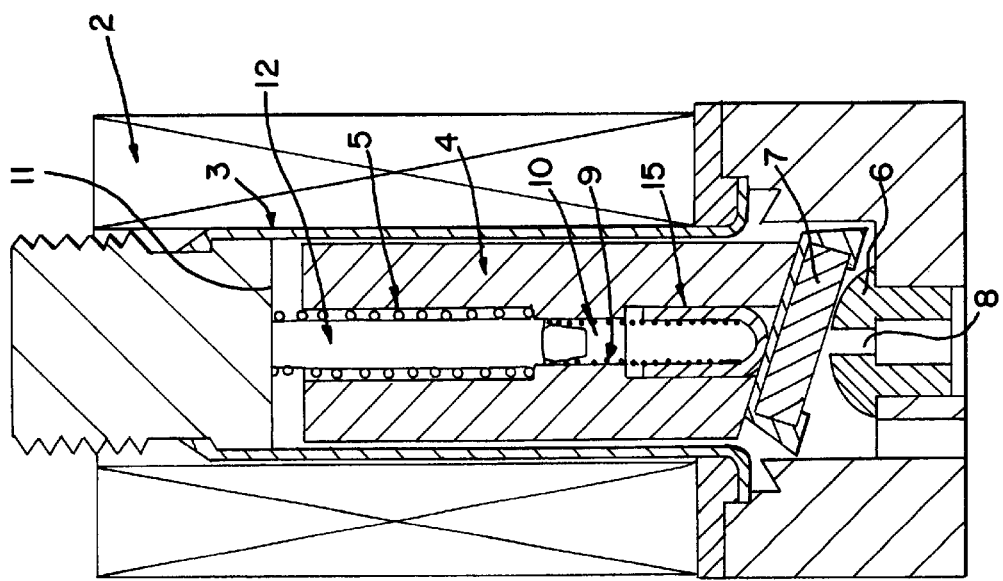
FIGS. 3 & 4 show an alternative embodiment of the solenoid valve according to the invention with activated or non-activated coil, respectively
Figure 3:
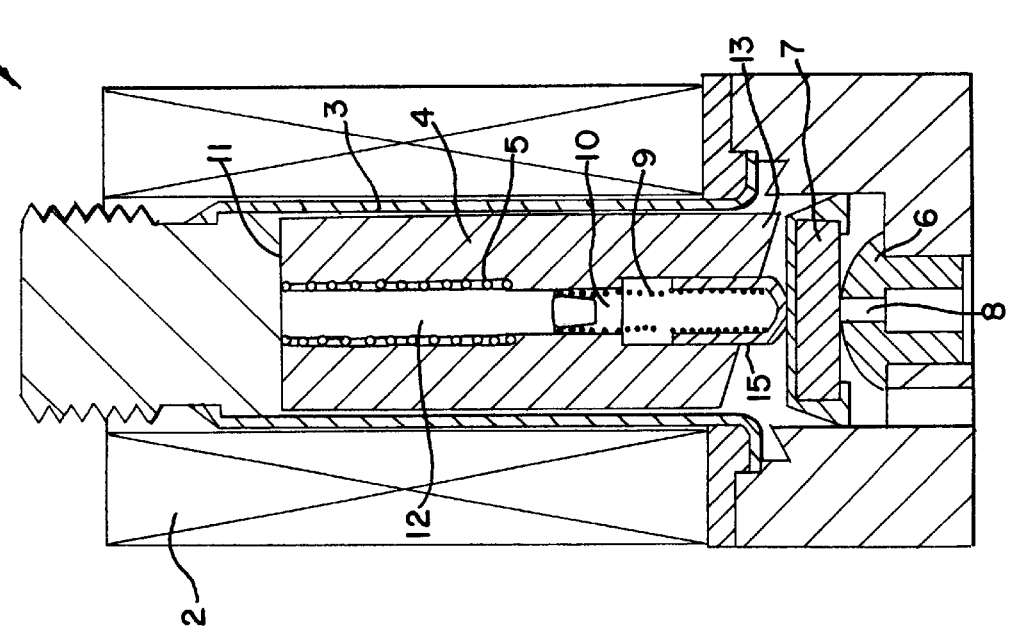

Alternatively, FIGS. 3 and 4 show an embodiment, in which most elements are made as shown in FIGS. 1 and 2 and are thus not explained, however, the closing spring 9 of the closing member 7 is arranged in a through-bore 10 in the armature 4, the closing spring 9 bearing on a pin 12, which is also arranged in the through-bore 10 in the armature 4, so that the pin 12 is surrounded by the armature 4 return spring 5 and the pin 12 bears on the armature guide bottom 11, so that the pressure reference of the closing spring 9, via the pin 12, is the armature guide bottom 11. At the front end of the closing spring 9 shown in FIGS. 3 and 4 a cup 15 is arranged, which extends in the through-bore 10 in the armature 4, which results in a spring force acting upon the closing member 7, which is centred in relation to the valve seat 6.

Figure 5:
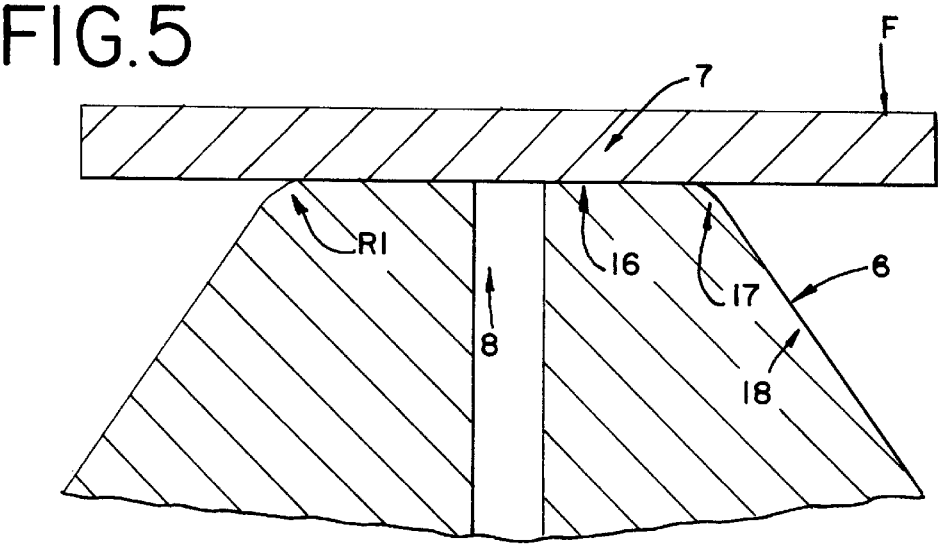
FIGS. 5, 6 & 7 show enlarged details of different embodiments of valve seat and closing member

The embodiment of the valve seat 6 and the closing member 7 sketched in FIG. 5 comprises a plane closing member 7, which in the closed position bears on a plane surface 16, which is vertical to the valve opening 8 and extends in a certain radial distance from the valve opening 8. At increasing radial distance from the valve opening 8, the plane surface 16 is transformed into a curved roll-off surface 17 with a curvature radius $R_1$, after which the curved roll-off surface 17 at a further diameter increase is transformed to a cone-shaped bearing surface 18. With this embodiment the rocking movement of the closing member 7, which is produced by the armature 4 (not shown) acting upon the closing member in the direction of the arrow F, will be a rolling movement of the closing member 7 over the curved roll-off surface 17 finished by the closing member 7 bearing on the cone-shaped bearing surface 18.

Figure 6:
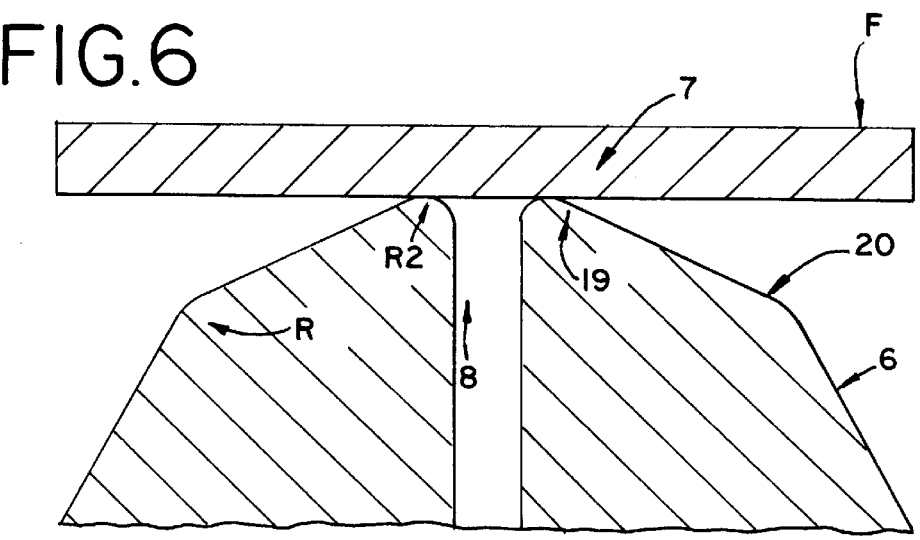

Accordingly, the embodiment of valve seat 6 and closing member 7 shown in FIG. 6 is made with a plane closing member 7, which is sealed towards the valve seat along a sealing surface 19 with a curvature with the radius $R_2$, whereas in FIG. 5 the sealing takes place along the plane surface 16. As in FIG. 5 an increased radial distance from the valve opening 8 will cause the sealing surface 19 to transform into a first conic surface, which transforms to a curvature $R_3$ at increased radial distance, after which the valve seat 6 transforms into a different cone. Also this embodiment produces a rolling movement of the closing member 7 in relation to the valve seat 6 through the armature (not shown) acting in the direction of the arrow F.

Figure 7:
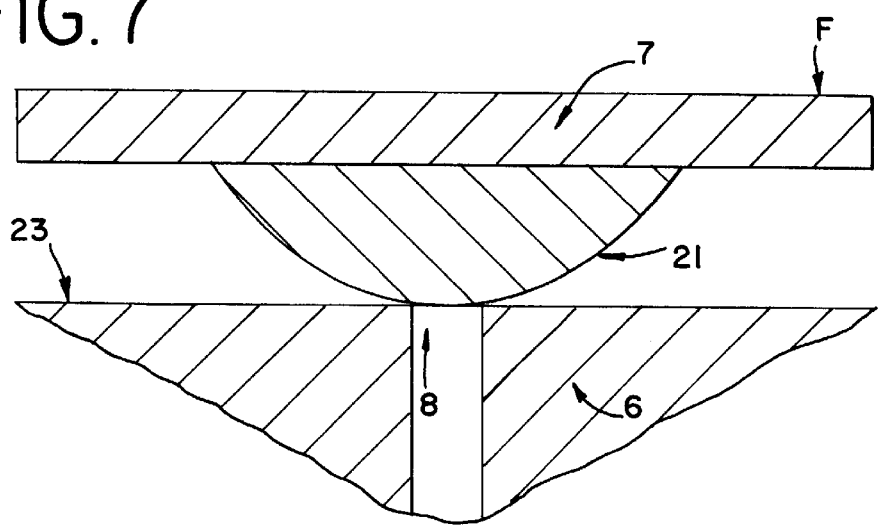

FIG. 7 roughs out an embodiment of the valve seat 6 and the closing member 7 in which the valve seat 6 is made with a plane surface 23 and the closing member 7 is made with a substantially ball-shaped surface 21, which can rock on the plane surface 23 of the valve seat 6, when the armature (not shown) acts upon the closing member 7 in the direction of the arrow F.

Figure 8:
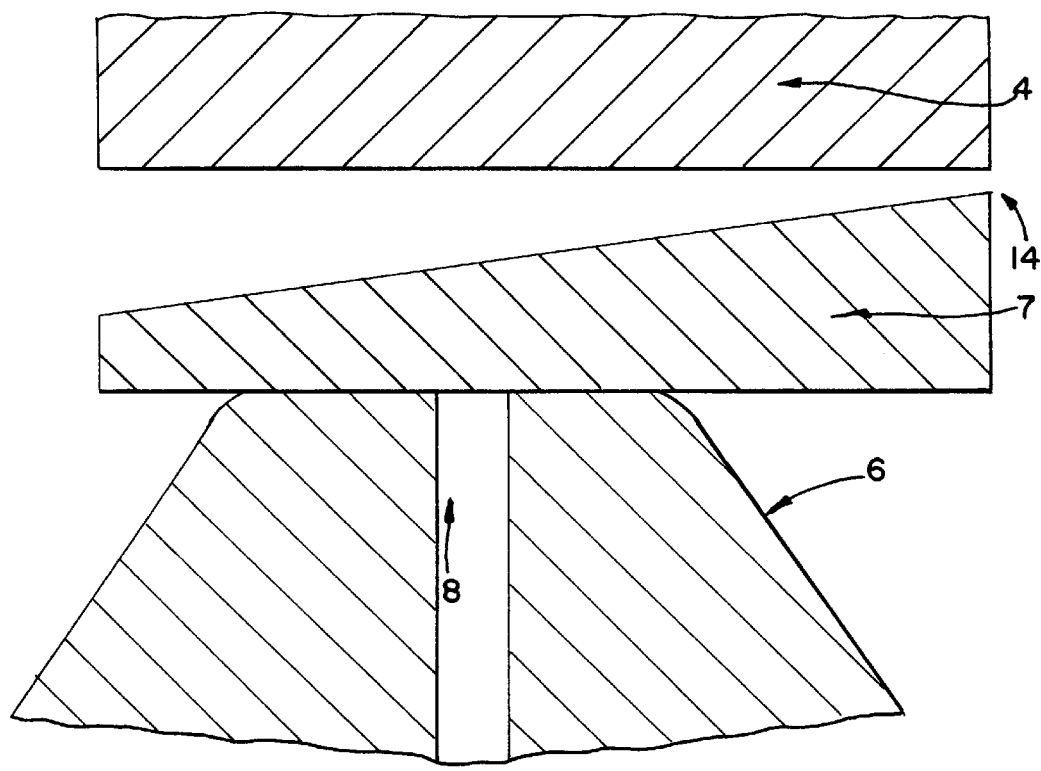
FIG. 8 shows an embodiment of the closing member, in which the closing member is provided with a projecting edge co-operating with the armature

FIG. 8 roughs out an alternative embodiment of the asymmetric acting of the armature 4 upon the closing member 7, in which the asymmetry of the action is produced by means of a projecting edge on the closing member 7, contrary to the embodiments shown in FIGS. 1 to 4, in which the asymmetry is produced by a projecting edge 13 on the armature 4. Further, FIG. 8 shows that the armature 4 is arranged asymmetrically in relation to the valve seat 6, which also contributes to the production of the asymmetric action between the armature 4 and the closing member 7.

FIGS. 5 to 8 do not show a closing spring 9 for acting upon the closing member 7 in the direction of the closed position, as shown in FIGS. 5 to 8, but obviously such a spring can be arranged between the closing member 7 and the armature 4, as shown in FIGS. 1 to 4.

What is claimed is:

1. Normally open solenoid valve comprising:

a coil surrounding a guide, an armature located in the guide, a return spring extending between the armature and a bottom end of the guide, a valve seat located at a valve opening, a closing member located between the armature and the valve seat, a closing spring extending between the armature and the closing member, the armature being movable towards the bottom end of the guide by energization of the coil, the return spring biasing the armature away from the bottom end of the guide, when the coil is deenergized, the closing member being urged towards the valve seat by the closing spring, the valve seat co-operating with the closing member for selectively, controlled by the movement of the armature, opening or closing the valve opening, the closing member co-operating with the armature, when the coil is deenergized, by means of a projecting edge at a point radially offset in relation to the valve seat centre, such that the closing member is activated by the movement of the armature to making a rocking movement with respect to a rolling contact/touching point between the closing member and the valve seat.

2. Solenoid valve according to claim 1, in which the valve seat has a rounded surface around which the closing member rocks.

3. Solenoid valve according to claim 1, in which the valve seat comprises a circular first plane surface around the valve opening, which place surface becomes at an increased radial distance from the valve opening a curved roll-off surface with a curvature radius, followed by a cone-shaped contact surface at further increased radial distance from the valve opening.

4. Solenoid valve according to claim 1, in which the valve seat comprises a sealing surface having one curvature radius, which at an increased radial distance from the valve opening becomes a curved roll-off surface with another curvature radius.

5. Solenoid valve according to claim 1, in which the valve seat is made with a plane surface and the closing member is made with a rounded surface, which rolls on the plane surface of the valve seat during the rocking movement.

6. Solenoid valve according to claim 1, in which the closing spring is located between the armature and the closing member for urging the closing member against the valve seat.

7. Solenoid valve according to claim 1, in which the closing member is acted upon along its center axis by the closing spring extending in a through-bore in the armature, the closing spring biasing the closing member with reference to a bottom of the armature guide.

8. Solenoid valve according to claim 7, in which the closing spring bears on a pin which extends in the through-bore in the armature, the pin being surrounded by a return spring of the armature and both the pin and armature return spring bearing on the bottom of the armature guide.

9. Solenoid valve according to claim 1, in which the armature includes the projecting edge, the edge acting upon an upper surface of the closing member, axial projection of the point towards the plane of the valve seat being outside the area of the valve seat.

10. Solenoid valve according to claim 1, in which the closing member has a projecting edge co-operating with the armature, the edge action upon an upper surface of the closing member at a point being radially offset in relation to the valve seat center, axial projection of the point towards to plane of the valve seat being outside the area of the valve seat.

11. Solenoid valve according to claim 1, in which the armature is arranged asymmetrically in relation to the closing member.

12. Method when using a solenoid valve according to claim 1, in which the solenoid valve is arranged in a fluid passage, where the fluid is intended to enter the valve via the valve opening in the valve seat, and the closing member, in the closed state, acts as a security valve which opens for fluid flow if the pressure difference between both sides of the closing member exceeds a value determined by the area of the valve seat opening and the force of the closing spring.

* * * * *